United States Patent
Liao et al.

(10) Patent No.: US 11,597,530 B2
(45) Date of Patent: Mar. 7, 2023

(54) CATALYTIC FUEL TANK INERTING SYSTEMS

(71) Applicant: Hamilton Sundstrand Corporation, Charlotte, NC (US)

(72) Inventors: Xiaohong Liao, Andover, CT (US); Erin G. Kline, Vernon, CT (US); Beakal T. Woldemariam, South Windsor, CT (US); Earl Jean LaVallee, Glastonbury, CT (US); Gregory R. Leaper, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 83 days.

(21) Appl. No.: 17/211,047

(22) Filed: Mar. 24, 2021

(65) Prior Publication Data
US 2021/0339883 A1    Nov. 4, 2021

Related U.S. Application Data

(60) Provisional application No. 63/018,811, filed on May 1, 2020.

(51) Int. Cl.
*B64D 37/32*    (2006.01)
*B01J 12/00*    (2006.01)
(Continued)

(52) U.S. Cl.
CPC ............ *B64D 37/32* (2013.01); *B01J 12/007* (2013.01); *B01J 19/0013* (2013.01); *B01J 19/14* (2013.01);
(Continued)

(58) Field of Classification Search
CPC .......... B01J 12/00; B01J 12/007; B01J 19/00; B01J 19/0006; B01J 19/0013; B01J 19/14;
(Continued)

(56) References Cited

U.S. PATENT DOCUMENTS 3,788,039 A * 1/1974 Bragg .................... B64D 37/32
261/78.2
3,847,298 A 11/1974 Hamilton
(Continued)

FOREIGN PATENT DOCUMENTS

EP    3666661 A1    6/2020
GB    1395691 A    5/1975

OTHER PUBLICATIONS

Anonymous: "Strahlpumpe—Wikipedia", Nov. 2, 2018 (Nov. 2, 2018), XP055835036, Retrieved from the Internet: URL: https://web.archive.org/web/20181102043600/https://de.wikipedia.org/wiki/Strahlpumpe [retrieved on Aug. 25, 2021], 5 pages.
European Search Report for European Application No. 21171608.9, dated Sep. 3, 2021, 12 pages.

*Primary Examiner* — Natasha E Young
(74) *Attorney, Agent, or Firm* — Cantor Colburn LLP

(57) ABSTRACT

Fuel tank inerting systems are described. The systems include a fuel tank having an inerting system flow path connected to the fuel tank. A catalytic reactor is arranged along the inerting system flow path configured to receive a reactant mixture of first reactant and a second reactant to generate inert gas. A condenser heat exchanger is arranged between the catalytic reactor and the fuel tank to cool an output from the catalytic reactor. A first ejector is configured to receive the first reactant and the second reactant and output the reactant mixture through an outlet. A second ejector is configured to receive an inert gas and the second reactant to output a mixture of the second reactant and the inert gas.

20 Claims, 5 Drawing Sheets

(51) Int. Cl.
    *B01J 19/00*     (2006.01)
    *B01J 19/14*     (2006.01)
(52) U.S. Cl.
    CPC .............. *B01J 2219/00103* (2013.01); *B01J 2219/00132* (2013.01); *B01J 2219/00164* (2013.01)
(58) Field of Classification Search
    CPC .......... B01J 2219/00; B01J 2219/00049; B01J 2219/00051; B01J 2219/00074; B01J 2219/00087; B01J 2219/00103; B01J 2219/00132; B01J 2219/00164; B64D 37/00; B64D 37/32
    See application file for complete search history.

(56) References Cited

U.S. PATENT DOCUMENTS

| | | |
|---|---|---|
| 7,306,644 B2 | 12/2007 | Leigh et al. |
| 7,445,659 B2 | 11/2008 | Schwalm |
| 8,015,838 B2 | 9/2011 | Lippold et al. |
| 8,602,362 B2 | 12/2013 | Buchwald |
| 9,211,954 B2 | 12/2015 | Barkowsky |
| 10,479,522 B2 | 11/2019 | Emerson et al. |
| 2018/0148188 A1 | 5/2018 | Surawski |
| 2018/0155050 A1* | 6/2018 | Surawski ............... B64D 13/08 |
| 2019/0185175 A1 | 6/2019 | Dardas et al. |
| 2019/0283895 A1 | 9/2019 | Emerson et al. |
| 2019/0291887 A1 | 9/2019 | Surawski et al. |

* cited by examiner

CATALYTIC FUEL TANK INERTING SYSTEMS

CROSS-REFERENCE TO RELATED APPLICATIONS

This application claims the benefit of U.S. Provisional Application Ser. No. 63/018,811 filed May 1, 2020, the disclosure of which is incorporated herein by reference in its entirety.

BACKGROUND

The subject matter disclosed herein generally relates to fuel tank inerting systems and, more particularly, to fuel tank inerting systems configured to supply inert gas, such as for onboard aircraft.

In general, aircraft pneumatic systems, including air conditioning systems, cabin pressurization and cooling, and fuel tank inerting systems are powered by engine bleed air. For example, pressurized air from an engine of the aircraft is provided to a cabin through a series of systems that alter the temperatures and pressures of the pressurized air. To power this preparation of the pressurized air, generally the source of energy is the pressure of the air itself.

The air bled from engines may be used for environmental control systems, such as used to supply air to the cabin and to other systems within an aircraft. Additionally, the air bled from engines may be supplied to inerting apparatuses to provide inert gas to a fuel tank. In other cases, the air may be sourced from compressed ram air.

Regardless of the source, typically the air for fuel tank inerting is passed through a porous hollow fiber membrane tube bundle known as an "air separation module." A downstream flow control valve is controlled or passively operated to apply back pressure on the air separation module to force some amount of air through the membrane as opposed to flowing through the tube. Oxygen passes more easily through the membrane, leaving only nitrogen enriched air to continue through the flow control valve into the fuel tank. Typically, air separation modules employ a dedicated ram air heat exchanger in conjunction with a bypass valve.

BRIEF DESCRIPTION

According to some embodiments, fuel tank inerting systems are provided. The fuel tank inerting systems include a fuel tank, an inerting system flow path connected to the fuel tank, a first reactant source configured to supply a first reactant into the inerting system flow path, a second reactant source configured to supply a second reactant into the inerting system flow path, a catalytic reactor arranged along the inerting system flow path configured to receive a reactant mixture comprising a mixture of the first reactant and the second reactant to generate an inert gas to be supplied to the fuel tank through the inerting system flow path to fill an ullage space of the fuel tank, a condenser heat exchanger arranged along the inerting system flow path between the catalytic reactor and the fuel tank and configured to cool an output from the catalytic reactor, a first ejector arranged along the inerting system flow path and configured to receive the first reactant at a first ejector first inlet, the second reactant at a first ejector second inlet, and output the reactant mixture through a first ejector outlet, and a second ejector arranged along the inerting system flow path and configured to receive an inert gas at a second ejector first inlet, the second reactant at a second ejector second inlet, and output a mixture of the second reactant and inert gas through a second ejector outlet.

In addition to one or more of the features described above, or as an alternative, further embodiments of the fuel tank inerting systems may include that a fluid pressure at the first ejector first inlet is less than a fluid pressure at the first ejector second inlet.

In addition to one or more of the features described above, or as an alternative, further embodiments of the fuel tank inerting systems may include that a fluid pressure at the first ejector outlet is a fluid pressure between the fluid pressure at the first ejector first inlet and the fluid pressure at the first ejector second inlet.

In addition to one or more of the features described above, or as an alternative, further embodiments of the fuel tank inerting systems may include that a fluid pressure at the second ejector first inlet is less than a fluid pressure at the second ejector second inlet.

In addition to one or more of the features described above, or as an alternative, further embodiments of the fuel tank inerting systems may include that a fluid pressure at the second ejector outlet is a fluid pressure between the fluid pressure at the second ejector first inlet and the fluid pressure at the second ejector second inlet.

In addition to one or more of the features described above, or as an alternative, further embodiments of the fuel tank inerting systems may include that the inerting system flow path includes a hot cycle junction downstream from the catalytic reactor and upstream from the condenser heat exchanger and a cool cycle junction downstream from the condenser heat exchanger and upstream from the fuel tank.

In addition to one or more of the features described above, or as an alternative, further embodiments of the fuel tank inerting systems may include that a portion of inert gas may be directed upstream from at least one of the hot cycle junction and the cool cycle junction.

In addition to one or more of the features described above, or as an alternative, further embodiments of the fuel tank inerting systems may include that the hot cycle junction is configured to direct hot inert gas to a location upstream of the catalytic reactor to be mixed with the reactant mixture.

In addition to one or more of the features described above, or as an alternative, further embodiments of the fuel tank inerting systems may include a hot cycle flow controller arranged between the hot cycle junction and the second ejector, wherein the hot cycle flow controller is configured to control a flow of hot inert gas.

In addition to one or more of the features described above, or as an alternative, further embodiments of the fuel tank inerting systems may include that the hot cycle flow controller is one of a valve or an orifice arranged along the inerting system flow path.

In addition to one or more of the features described above, or as an alternative, further embodiments of the fuel tank inerting systems may include that the cool cycle junction is configured to direct cool inert gas to a location upstream of the catalytic reactor to be mixed with the reactant mixture.

In addition to one or more of the features described above, or as an alternative, further embodiments of the fuel tank inerting systems may include a cool cycle flow controller arranged between the cool cycle junction and the second ejector, wherein the cool cycle flow controller is configured to control a flow of cool inert gas.

In addition to one or more of the features described above, or as an alternative, further embodiments of the fuel tank inerting systems may include that the cool cycle flow controller is an isolation valve.

In addition to one or more of the features described above, or as an alternative, further embodiments of the fuel tank inerting systems may include that the fuel tank inerting system does not include a recirculation heat exchanger.

In addition to one or more of the features described above, or as an alternative, further embodiments of the fuel tank inerting systems may include a water collector arranged downstream from the condenser heat exchanger along the inerting system flow path.

In addition to one or more of the features described above, or as an alternative, further embodiments of the fuel tank inerting systems may include that the first reactant is fuel and the second reactant is air.

In addition to one or more of the features described above, or as an alternative, further embodiments of the fuel tank inerting systems may include that the first reactant source is the fuel tank.

In addition to one or more of the features described above, or as an alternative, further embodiments of the fuel tank inerting systems may include a heating coil wrapped around the catalytic reactor, the heating coil configured to heat the first reactant upstream of the first ejector.

In addition to one or more of the features described above, or as an alternative, further embodiments of the fuel tank inerting systems may include a shielding cover configured to at least one of thermally insulate and retain the heating coil to the catalytic reactor.

In addition to one or more of the features described above, or as an alternative, further embodiments of the fuel tank inerting systems may include that the heating coil is wrapped around the catalytic reactor such that the first reactant will vaporize as it passes through the heating coil.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1A:
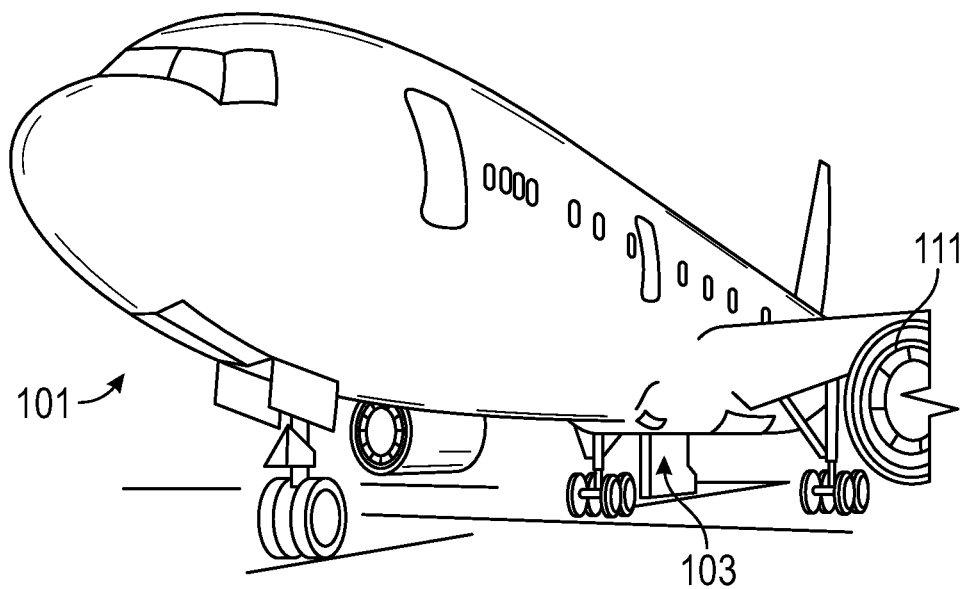
FIG. 1A is a schematic illustration of an aircraft that can incorporate various embodiments of the present disclosure.
Figure 1B:
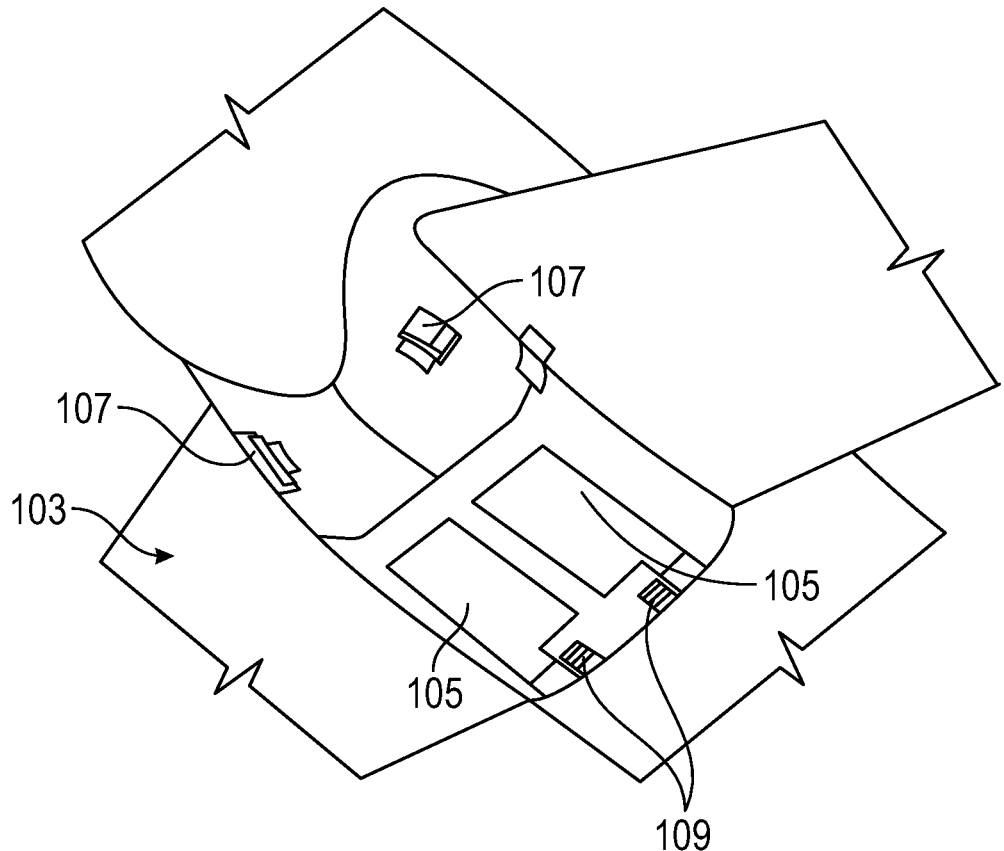
FIG. 1B is a schematic illustration of a bay section of the aircraft of FIG. 1A.

FIGS. 1A-1B are schematic illustrations of an aircraft 101 that can employ one or more embodiments of the present disclosure. As shown in FIGS. 1A-1B, the aircraft 101 includes bays 103 beneath a center wing box. The bays 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhausted through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve a desired oxygen separation. Such systems require a high pressure pneumatic source to drive the separation process across the membrane. Further, the hollow fiber membrane separators commonly used are relatively large in size and weight, which is a significant consideration with respect to aircraft (e.g., reductions in volume and weight of components can improve flight efficiencies). Embodiments provided herein provide reduced volume and/or weight characteristics of inert-gas or low-oxygen supply systems for aircraft. Further, embodiments provided herein can prevent humid air from entering fuel tanks of the aircraft, thus preventing various problems that may arise with some fuel system components. In accordance with some embodiments of the present disclosure, the typical hollow fiber membrane separator is replaced by a catalytic system (e.g., $CO_2$ generation system), which can be, for example, smaller, lighter, and/or more efficient than the typical fiber membrane separators. That is, in accordance with embodiments of the present disclosure, the use of hollow fiber membrane separators may be eliminated.

A function of fuel tank flammability reduction systems in accordance with embodiments of the present disclosure is accomplished by reacting a small amount of fuel vapor (e.g., a "first reactant") with a source of gas containing oxygen (e.g., a "second reactant"). The product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material is used to induce a chemical reaction, including, but not limited to, precious metal materials. The carbon dioxide that results from the reaction is an inert gas that is mixed with nitrogen naturally found in fresh/ambient air, and is directed back within a fuel tank to create an inert environment within the fuel tank, thus reducing a flammability of the vapors in the fuel tank. Further, in some embodiments, the fuel tank flammability reduction or inerting systems of the present disclosure can provide a functionality such that water vapor from the atmosphere does not enter the fuel tanks during descent stages of flight of an aircraft. This can be accomplished by controlling a flow rate of inert gas into the fuel tank so that a positive pressure is continuously maintained in the fuel tank.

In accordance with embodiments of the present disclosure, a catalyst is used to induce a chemical reaction between oxygen ($O_2$) and fuel vapor to produce carbon dioxide ($CO_2$) and water vapor. The source of $O_2$ used in the reaction can come from any of a number of sources, including, but not limited to, pneumatic sources on an aircraft that supply air at a pressure greater than ambient. The fuel vapor is created by draining a small amount of fuel from an aircraft fuel tank into an evaporator container. The fuel can be heated to vaporize the fuel and generate the first reactant (fuel vapor), such as by using an electric heater, as will be appreciated by those of skill in the art. The fuel vapor is removed from the evaporator container, in some embodiments, by an ejector which can induce a suction pressure that pulls the fuel vapor out of the evaporator container. Such ejectors can utilize elevated pressures of a second reactant source containing $O_2$ (e.g., a pneumatic source) to induce a secondary flow of the ejector which is sourced from the evaporator container. As such, the ejector can be used to mix the extracted fuel vapor with the $O_2$ from a second reactant source.

The mixed air stream (fuel vapor and oxygen or air) is then introduced to a catalyst, which induces a chemical reaction that transforms the $O_2$ and fuel vapor into $CO_2$ and water vapor. Any inert gas species that are present in the mixed stream (for example, nitrogen), will not react and will thus pass through the catalyst unchanged. In some embodiments, the catalyst is in a form factor that acts as a heat exchanger. For example, in one non-limiting configuration, a plate fin heat exchanger configuration is employed wherein a hot side of the heat exchanger would be coated with catalyst material. In such an arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

As noted above, the catalytic chemical reaction generates water vapor. Having water (in any form) enter a primary fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses and drops out of the product gas stream (i.e., condenses an output of the catalytic reactor). The liquid water can then be drained overboard. In some embodiments, an optional water separator can be used to augment or provide water separation from the product stream.

In some embodiments, a flow control valve meters a flow of an inert gas (with water vapor removed therefrom) to a predetermined and/or controlled inert gas flow rate. Further, in some embodiments, an optional fan can be used to boost the inert gas stream pressure to overcome a pressure drop associated with ducting and flow lines between the catalyst and a fuel tank into which the inert gas is supplied. In some embodiments, a flame arrestor can be arranged at an inlet to the fuel tank (where the inert gas enters) to prevent any potential flames from propagating into the fuel tank.

Independent of any aircraft flammability reduction systems, aircraft fuel tanks are typically vented to ambient. At altitude, pressure inside the fuel tank is very low and is roughly equal to ambient pressure. However, during descent, the pressure inside the fuel tank needs to rise to equal ambient pressure at sea level (or at whatever altitude the aircraft is landing). The change in pressures requires gas entering the tank from outside to equalize the pressure. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water from entering the fuel tank.

Figure 2:
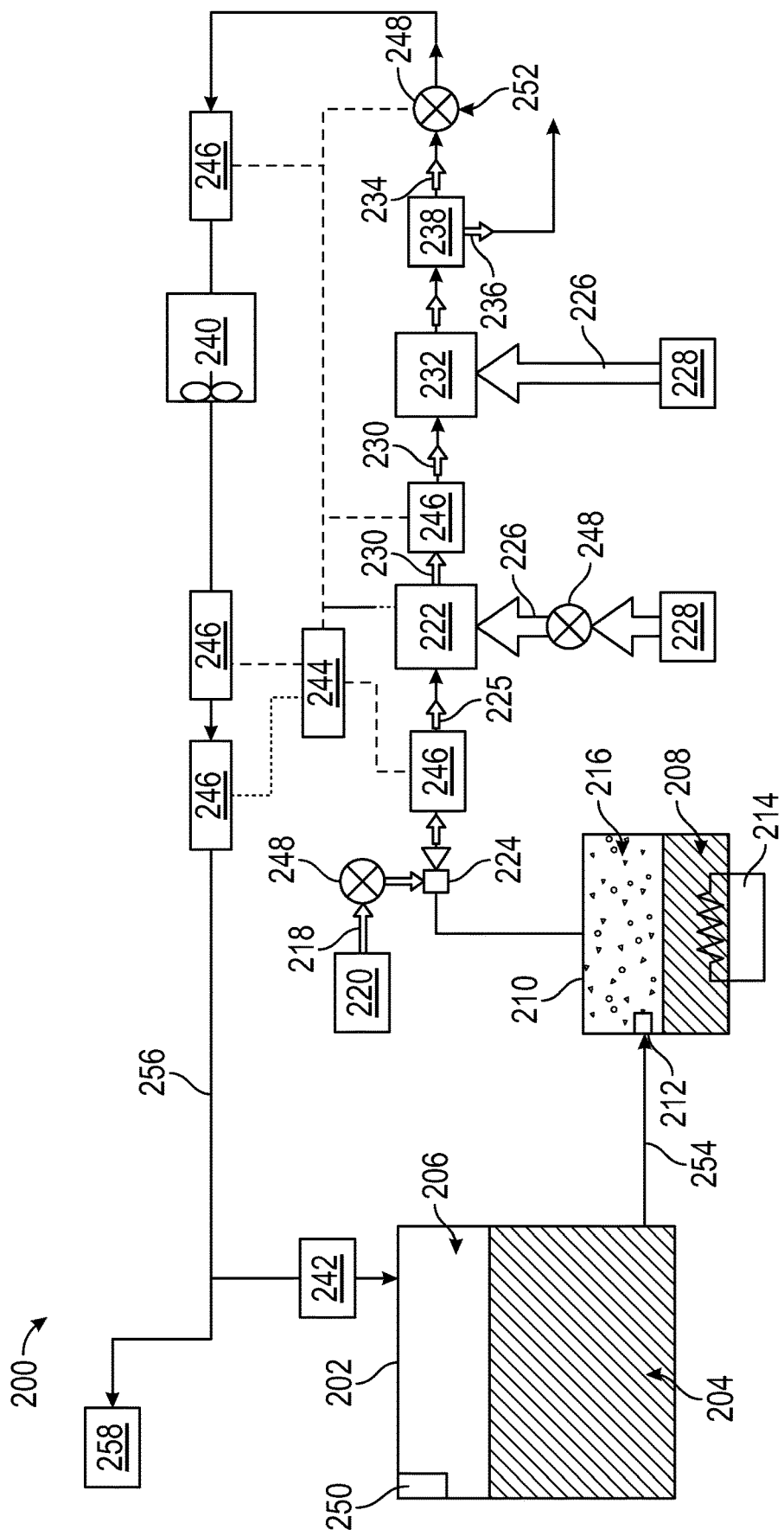
FIG. 2 is a schematic illustration of a fuel tank inerting system that can incorporate embodiments in accordance with an embodiment of the present disclosure.

FIG. 2 is a schematic illustration of a flammability reduction or inerting system 200 utilizing a catalytic reaction to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

In accordance with embodiments of the present disclosure, a portion of the fuel 204 can be extracted as inerting fuel 208 from the fuel tank 202 and into an evaporator container 210. The amount of fuel 204 that is extracted into the evaporator container 210 (i.e., the amount of inerting fuel 208) can be controlled by an evaporator container valve 212, such as a float valve. The inerting fuel 208, which may be in liquid form when pulled from the fuel tank 202, can be vaporized within the evaporator container 210 using a heater 214, such as an electric heater, to generate a first reactant 216. The first reactant 216 is a vaporized portion of the inerting fuel 208 located within the evaporator container 210. The first reactant 216 is mixed with a second reactant 218 which is sourced from a second reactant source 220. The second reactant 218 is air containing oxygen that is catalyzed with the first reactant 216 to generate an inert gas to be supplied into the ullage space 206 of the fuel tank 202. The second reactant 218 can come from any source on an aircraft that is at a pressure greater than ambient, including, but not limited to bleed air from an engine, cabin air, high pressure air extracted or bled from an engine, etc. (i.e., any second reactant source 220 can take any number of configurations and/or arrangements). The first reactant 216 within the evaporator container 210 and the second reactant 218 can be directed into a catalytic reactor 222 by and/or through a mixer 224, which, in some embodiments, may be an ejector or jet pump. The mixer 224 will mix the first and second reactants 216, 218 into a mixed air stream 225.

The catalytic reactor 222 can be temperature controlled to ensure a desired chemical reaction efficiency such that an inert gas can be efficiently produced by the inerting system 200 from the mixed air stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236. That is, the heat exchanger 232 may condense an output of the catalytic reactor 222. A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be liquid water or water vapor, and thus in the present configuration shown in FIG. 2, a water separator 238 is provided downstream of the heat exchanger 232 to extract the liquid water or water vapor from the catalyzed mixture 230, thus leaving only the inert gas 234 to be provided to the ullage space 206 of the fuel tank 202.

The inerting system 200 can include additional components including, but not limited to, a fan 240, a flame arrestor 242, and a controller 244. Various other components can be included without departing from the scope of the present disclosure. Further, in some embodiments, certain of the included components may be optional and/or eliminated. For example, in some arrangements, the fan 240 and/or the water separator 238 can be omitted. The controller 244 can be in operable communication with one or more sensors 246 and valves 248 to enable control of the inerting system 200.

In one non-limiting example, flammability reduction is achieved by the inerting system 200 by utilizing the catalytic reactor 222 to induce a chemical reaction between oxygen (second reactant 218) and fuel vapor (first reactant 216) to produce carbon dioxide (inert gas 234) and water in vapor phase (byproduct 236). The source of the second reactant 218 (e.g., oxygen) used in the reaction can come from any source on the aircraft that is at a pressure greater than ambient. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, as noted above, the mixer 224 is used to mix the two gas streams (first and second reactants 216, 218) together to form the mixed air stream 225.

The mixed air stream 225 (e.g., fuel vapor and oxygen or air) is then introduced to the catalytic reactor 222, inducing a chemical reaction that transforms the mixed air stream 225 (e.g., fuel and air) into the inert gas 234 and the byproduct 236 (e.g., carbon dioxide and water vapor). It is noted that any inert gas species that are present in the mixed air stream 225 (for example, nitrogen) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the temperature of the hot mixed gas stream 225 is hot enough to sustain the chemical reaction desired within the catalytic reactor 222, but cool enough to remove the heat generated by the exothermic reaction, thus maintaining aircraft safety and materials from exceeding maximum temperature limits.

As noted above, the chemical reaction process within the catalytic reactor 222 can produce byproducts, including water in vapor form. It may be undesirable to have water (in any form) enter the fuel tank 202. Accordingly, water byproduct 236 can be removed from the product gas stream (i.e., inert gas 234) through condensation. To achieve this, catalyzed mixture 230 enters the heat exchanger 232 that is used to cool the catalyzed mixture 230 such that the byproduct 236 can be removed (e.g., a majority of the water vapor condenses and drops out of the catalyzed mixture 230). The byproduct 236 (e.g., liquid water) can then be drained overboard. An optional water separator 238 can be used to accomplish this function.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient. Thus, as shown in FIG. 2, the fuel tank 202 includes a vent 250. The vent 250 can be passive or active to allow for venting of gas within the ullage 206 to vent out of the fuel tank 202. For example, in some embodiments, the vent 250 can enable venting of gas (and thus pressure) from within the fuel tank 202 and/or pressure that may build within the inerting system 200 (i.e., within the conduits thereof). In embodiments in which the vent 250 can be a passive vent system, with operation of the vent 250 being based upon a pressure within the ullage 206. In other embodiments where the vent 250 is actively controlled, a controller, as described herein, may selectively control operation of the vent 250. Further, in some embodiments, the vent 250 may operate both in a passive and active manner, allowing for control during some operations but also enabling venting if a pressure within the ullage 206 exceeds a threshold of the vent 250.

At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize the pressure. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

As noted above, the controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258, as schematically shown.

A catalytic fuel tank inerting system, such as that shown and described with respect to FIG. 2, may generate $CO_2$ (inert gas) for the fuel tank ullage by reacting a fuel-air mixture in a catalytic reactor. A recirculation heat exchanger and a condenser are typically needed in catalytic inerting systems to maintain a required inlet temperature to catalytic reactor. However, such designs may be subject to various drawbacks, including, for example, high system impedance, relatively large volume, and a need for specific parts or components to assist a start-up procedure.

Figure 3:
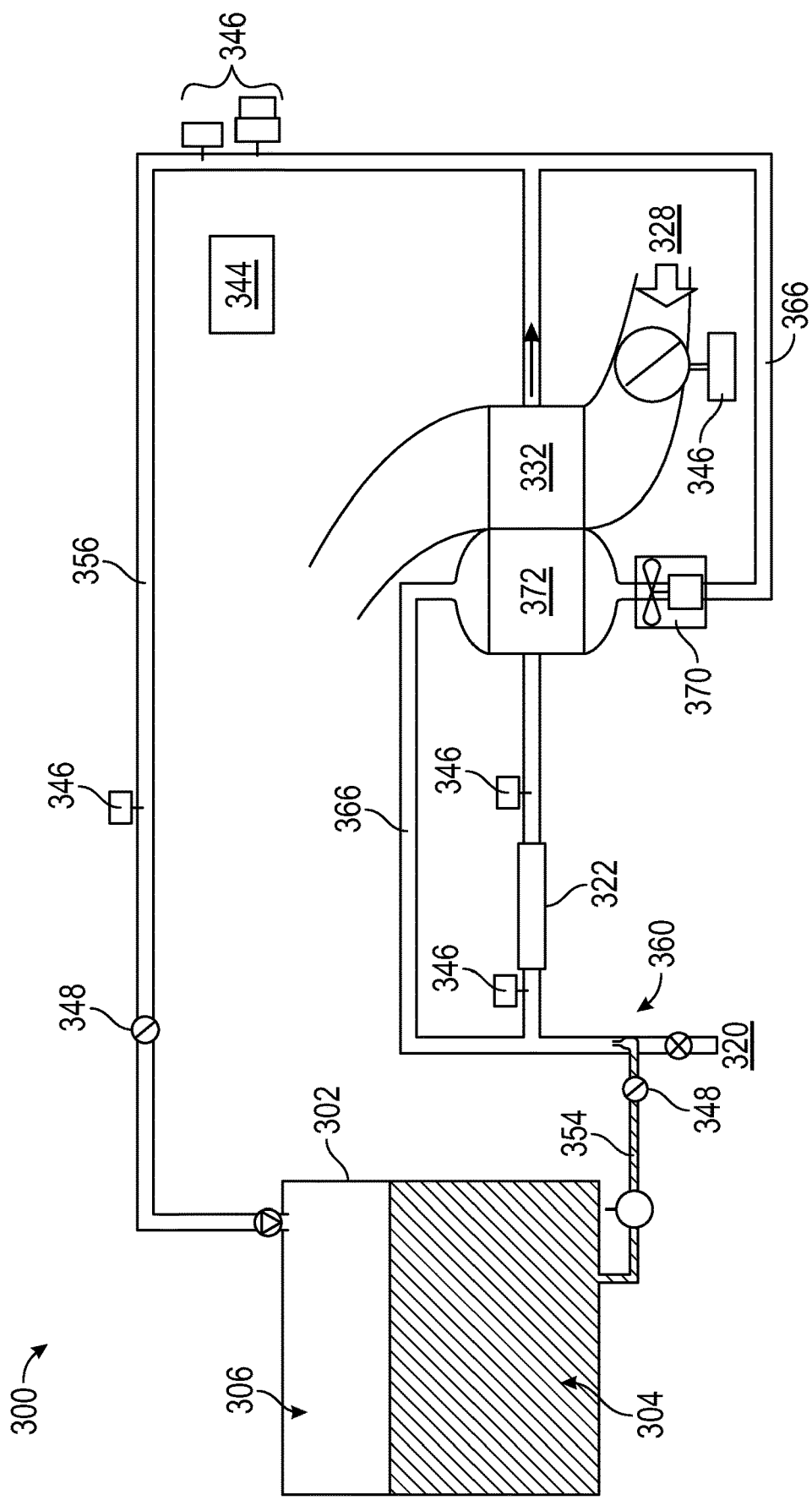
FIG. 3 is a schematic illustration of a fuel tank inerting system that can incorporate embodiments in accordance with an embodiment of the present disclosure.

For example, turning now to FIG. 3, an embodiment of an inerting system 300 is shown. The inerting system 300 may be similar to that shown and described above, and thus similar features may not be shown or discussed for simplicity.

As shown, the inerting system 300 includes a fuel tank 302 having fuel 304 therein, with an ullage space 306 formed as fuel 304 is consumed during use. In this embodiment, an inerting supply line 354 fluidly connects the fuel tank 302 to a metering valve system 360 which can inject fuel, i.e., a first reactant, into a second reactant that is sourced from a second reactant source 320. Thus the first reactant and the second reactant may be mixed. The mixed first and second reactants are then reacted within the catalytic reactor 322 to generate an inert gas for supply into one or more fuel tanks (e.g., fuel tank 302). In this embodiment, a cool air source 328, such as ram air, is provided to enable the condensing function within a heat exchanger 332, as described above. The heat exchanger 332 operates as a condenser on the catalyzed mixture to separate out an inert gas and a byproduct, such as water. The inert gas is then passed along a fuel tank supply line 356 to supply the inert gas to the ullage 306 of the fuel tank 302. The fuel tank 302 can include a vent, as described above.

The inerting system 300 includes a controller 344 that may be operably connected to the various components of the inerting system 300, including, but not limited to, one or more sensors 346 and one or more valves 348, that are arranged at various locations to enable control of the inerting system 300 (e.g., to control fluid flow therethrough). The controller 344 can be configured to receive input from the sensors 346 to control the valves 348 and thus maintain appropriate levels of inert gas within the ullage space 306. The sensors 346 can include an inlet sensor that is arranged upstream of the catalytic reactor 322 and an outlet sensor is arranged downstream from the catalytic reactor 322. The inlet and outlet sensors may be operably connected to the controller 344 such that the controller 344 can monitor inlet and outlet temperatures of the catalytic reactor 322. When the catalytic reactor 322 is generating an inert gas, the outlet temperature will be higher than the inlet temperature. However, if the catalytic reactor 322 is not operating, the inlet and outlet temperatures will be substantially similar. Thus, the controller 344 can monitor the operating status of the catalytic reactor 322.

The catalytic process may be maintained, in part, through the use of a recirculation loop 366. The recirculation loop 366 is configured to extract a portion of the inert gas downstream from the catalytic reactor 322. This extracted inert gas is recycled back to the inlet through the recirculation loop 366. A fan 370, such as a variable speed fan, is configured to drive the recycled inert gas through the recirculation loop 366 which includes a recirculation heat exchanger 372 and then mixes the recycled inert gas back into the mixed first and second reactants. The recirculation heat exchanger 372 is configured to thermally interact the recycled inert gas with the outlet gas from the catalytic reactor 322, thus heating the recycled inert gas. The heated recycled inert gas is mixed with the first and second reactants to control the temperature thereof in order to maintain an operational temperature of the catalytic reactor 322.

In order to reduce the number of components, reduce the volume occupied by inerting systems, and reduce system impedance, embodiments of the present disclosure are directed to, at least, eliminating the recirculation heat exchanger from the system. Further, embodiments of the present disclosure are configured to reduce the number of active or mechanical components. That is, by introducing passive (e.g., no moving parts) components, the catalytic inerting systems described herein may be relatively simpler than prior systems, and have few components and points of potential failure.

In some catalytic inerting systems, a booster (e.g., a fan or compressor) may be required to deliver the inert gas (e.g., oxygen depleted air) to the fuel tank and maintain a desired reactor outlet temperature by flow multiplication/recirculation. The booster typically includes moving parts and may require variable speed control, thus introducing complexity into the system. However, in accordance with some embodiments of the present disclosure, if a relatively high pressure source (such as bleed air (e.g., about 30 psia to about 50 psia) is available and the system has low enough impedance (e.g., less than 1 psid), the booster can be replaced by an ejector that has no any moving parts and has no control requirements. Such modifications may be achieved in relatively small volume inerting systems (e.g., less than about 6,000 gallons).

Figure 4:
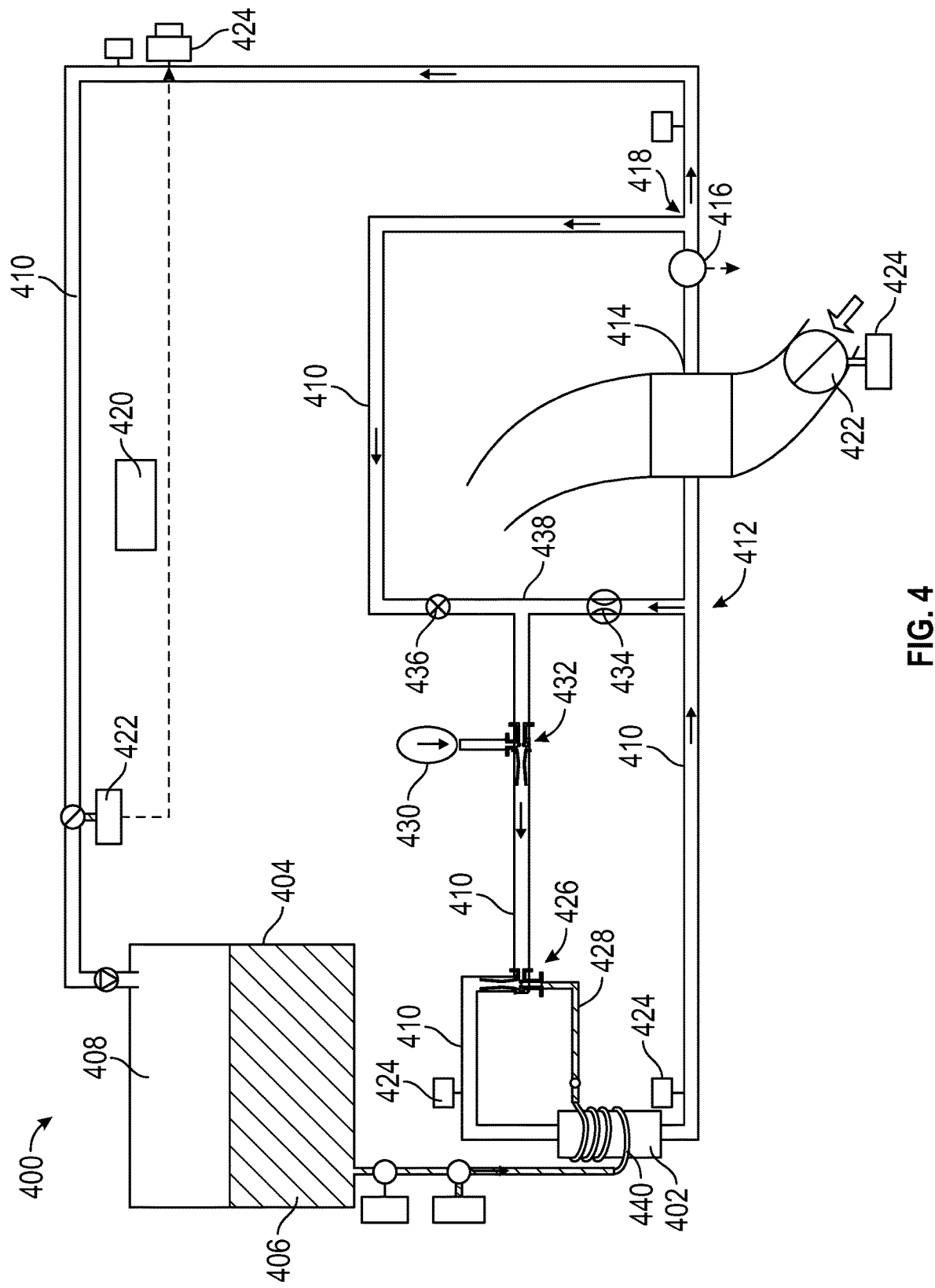
FIG. 4 is a schematic illustration of a fuel tank inerting system in accordance with an embodiment of the present disclosure.

Turning now to FIG. 4, a schematic illustration of an embodiment of an inerting system 400 in accordance with an embodiment of the present disclosure is shown. The inerting system 400 may be similar to that shown and described above, and thus similar features may not be shown or discussed for simplicity. The inerting system 400 enables control of an operating temperature of a catalytic reactor 402 while reducing the number of components as compared to prior systems, such as shown in FIG. 3.

The inerting system 400 includes a fuel tank 404 that is operably connected to the catalytic reactor. A fuel 406 (e.g., liquid fuel) is contained within the fuel tank 404 and an ullage 408 (e.g., empty space) is present within the fuel tank 404. The ullage 408 is to be filled with an inert gas supplied by the inerting system 400. A vaporized fuel and an air mixture can be injected into an inerting system flow path 410 to be supplied into the catalytic reactor 402 to generate an inert gas, as described above. Downstream from the catalytic reactor 402 along the inerting system flow path 410 is a hot cycle junction 412, a condensing heat exchanger 414, a water collector 416, a cool cycle junction 418, and the ullage 408. As will be appreciated by those of skill in the art, other additional features and components may be included along the inerting system flow path 410. Furthermore, in some embodiments, some components may be omitted based on the specific system configuration and requirements thereof. The inerting system 400 includes a system controller 420 that may be operably connected to one or more valves 422 and sensors 424, or other valves/sensors located throughout and associated with the inerting system 400.

In this illustrative embodiment, rather than including a recirculation heat exchanger (e.g., as shown in FIG. 3), the inerting system 400 includes one or more ejectors arranged along the inerting system flow path 410. As shown, a first ejector 426 is arranged to mix a fuel with an airstream at a location upstream of the catalytic reactor 402. The first ejector 426 receives a relatively low pressure first reactant (e.g., fuel) from a first reactant supply line 428 and a relatively high pressure second reactant (e.g., air) from, at least, a second reactant source 430. The source of the first reactant may be the fuel tank 404 and the second reactant source 430 may be a high pressure bleed air source. Because of the high pressure of the second reactant when it reaches the first ejector 426, the first ejector 426 will cause the first reactant and the second reactant to mix prior to entering the catalytic reactor 402 and be catalyzed therein to generate an inert gas.

A second ejector 432 is arranged upstream of the first ejector 426. The second ejector 432 is configured to mix the second reactant, from the second reactant source 430, with a portion of recycled inert gas. The second ejector 432 can receive inert gas from one or both of the hot cycle junction 412 and the cool cycle junction 418, as illustratively shown. Between the hot cycle junction 412 and the second ejector 432 along this branch of the inerting system flow path 410 is a hot cycle flow controller 434. In some configurations, the hot cycle flow controller 434 may be a passive component, such as an orifice or reduced cross-section of ducting/pipe. In other embodiments, the hot cycle flow controller 434 may be a passive or actively controlled flow metering valve. In some configurations, the hot cycle flow controller 434 may be operably controlled by the system controller 420.

Similarly, the amount of inert gas pulled from the cool cycle junction 418 may be controlled, at least in part, by a cool cycle flow controller 436. In some configurations, the cool cycle flow controller 436 may be a passive component, such as an orifice or reduced cross-section of ducting/pipe. In other embodiments, the cool cycle flow controller 436 may be a passive or actively controlled flow metering valve. In some configurations, the cool cycle flow controller 436 may be operably controlled by the system controller 420. In some embodiments, for example, the cool cycle flow controller 436 may be an isolation valve that is controlled particularly at a time of system startup of the inerting system 400. When the cool cycle flow controller 436 is closed, all of the inert gas pulled by the fan 426 may be from the hot cycle junction 412 and thus a temperature of the mixed reactants supplied to the catalytic reactor 402 can be increased rapidly. After system start, the cool cycle flow controller 436 can be opened to allow a cool inert gas to be pulled through the system and enable temperature control at the inlet of the catalytic reactor 402.

As such, a mixing junction 438 is arranged at a junction between the hot cycle junction 412 and the cool cycle junction 418 along the inerting system flow path 410. The mixing junction 438 receives inert gas from each of the hot cycle junction 412 and the cool cycle junction 418, selectively, based on the status and state of the hot cycle flow 434 and the cool cycle flow controller 436. The operation, control, and configuration of the first ejector 426, the second ejector 432, the hot cycle flow controller 434, and the cool cycle flow controller 436 may be such that relatively cool air from the cool cycle junction 418 and relatively hot air from the hot cycle junction 412 may be drawn along the inerting system flow path 410 upstream of the catalytic reactor 402. By pulling air from each of the cool cycle junction 418 and the hot cycle junction 412, the second ejector 432 can cause a mixing of the two flows of air at a mixing junction 438. The mixed inert gas at the mixing junction 438 will be pulled through the second ejector 432 to mix the inert gas with the high pressure second reactant. Subsequently, the second reactant, mixed with some amount of inert gas, will flow into and through the first ejector 426 to be mixed with the first react prior to entering the catalytic reactor 402.

In some configurations, and as shown in FIG. 4, the first reactant may be pre-heated prior to mixing with the second reactant at the first ejector 426. In this illustrative embodiment, the pre-heating is provided from the catalytic reactor 402 itself. That is, the heat generated by the exothermic reaction that occurs within the catalytic reactor 402 can be passed or transferred to the first reactant (fuel) prior to mixing of the first and second reactants. This is achieved by employing heating coils 440 wrapped about and in thermal communication with the catalytic reactor 402. This allows for additional thermal control within the inerting system 400. Furthermore, in some embodiments, the heating coils 440 can be configured such that the heat transferred into the first reactant enables vaporization of the first reactant prior to mixing with the second reactant within the second ejector 426. This enables a passive mechanism to vaporize the first reactant, without requiring additional heaters or components, or at least minimizing such components. For example, in some configurations, at the time of initiation and startup, and additional heating element may be required to ensure light-off of the catalytic reactor 402 by vaporizing the first reactant initially. However, once the catalytic reactor 402 is activated and catalyzing the first and second reactants, the vaporization can be maintained by the exothermic reaction and the heating coils 440.

Figure 5:
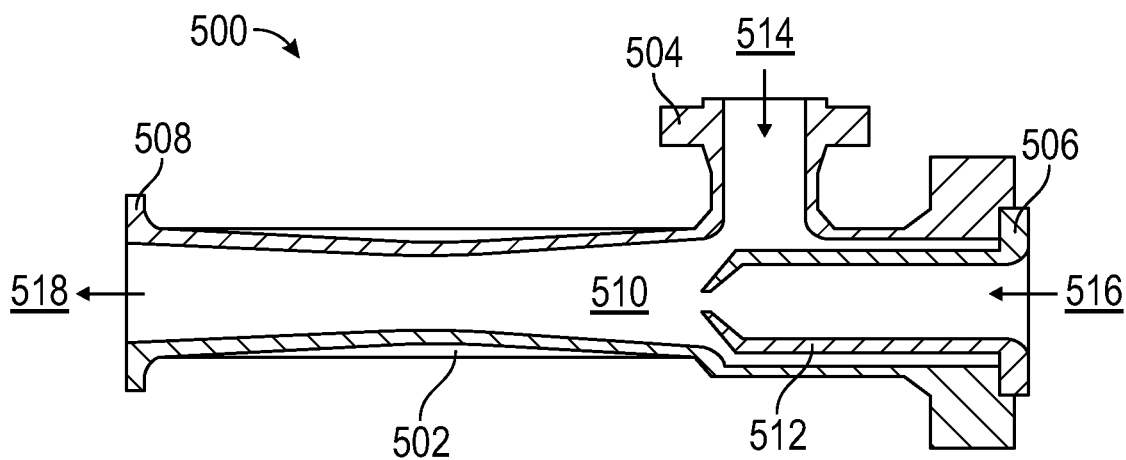
FIG. 5 is a schematic illustration of an ejector that may be employed in accordance with an embodiment of the present disclosure.

Turning now to FIG. 5, a schematic illustration of an ejector 500 in accordance with an embodiment of the present disclosure is shown. The ejector 500 is schematically illustrative of either the first or second ejectors that can be employed in inerting systems of the present disclosure. The ejector 500 has an ejector body 502 having a first inlet 504, a second inlet 506, and an outlet 508. The ejector body 502 defines an internal mixing chamber 510 and has at least one nozzle 512 configured to control a flow of fluid that passes through the second inlet 506 and into the mixing chamber 510.

In operation, the ejector 500 is a passive component that allows for mixing of fluids within the mixing chamber 510 and supplying the mixed fluids out through the outlet 508. A first fluid 514 may be supplied from a first source into the first inlet 504 and a second fluid 516 may be supplied from a second source into the second inlet 516. As noted, a fluid mixture 518 of the first and second fluids 514, 516, mixed in the mixing chamber 510, will exit the ejector 500 through the outlet 508.

The ejector 500 is a form of pump without moving parts. The first and second fluids 514, 516 have different pressures, and the pressure differential enables operation of the static structure ejector 500. A low pressure suction is provided from the first fluid 514, which provides a negative pressure differential across the nozzle 512, which pulls the second fluid 516 through the nozzle 512 and into the mixing chamber 510. The mixed fluid 518 is expelled through the outlet 508 due to a high pressure motive force provided by the relatively high pressure of the second fluid 516. The resulting mixed fluid 518 has a mid-pressure that is between the relatively low pressure of the first fluid 514 and the relatively high pressure of the second fluid 516.

As applied to the example embodiment of an inerting system shown in FIG. 4, and specifically to the first ejector 426, the first fluid is the first reactant (e.g., vaporized fuel) which has a relatively lower pressure than the second fluid. The second fluid is the mixed second reactant and inert gas that is sourced from the second reactant source 430 and the mixing junction 438, having a higher pressure than the first fluid. The resulting mixture of the first and second reactants (output fluid) will have a pressure that is between the pressure of the first and second fluids. For example, in one non-limiting configuration of an inerting system in accordance with an embodiment of the present disclosure, the first fluid (first fluid input) may have a pressure of about 14.7 psi, the second fluid (second fluid input) may have a pressure of about 15.1 psi, and the mixed output fluid may have a pressure of about 15.0 psi.

As applied to the example embodiment of an inerting system shown in FIG. 4, and specifically to the second ejector 432, the first fluid may be the inert gas from the mixing junction 438, having a relatively low pressure. The second fluid is the relatively high pressure second reactant supplied from the second reactant source 430. The resulting mixture of the inert gas and the second reactant (output fluid) will have a pressure that is between the pressure of the first and second fluids. For example, in one non-limiting configuration of an inerting system in accordance with an embodiment of the present disclosure, the first fluid (first fluid input) may have a pressure of about 14.7 psi, the second fluid (second fluid input) may have a pressure of about 49.7 psi, and the mixed output fluid may have a pressure of about 15.1 psi.

The pressure differentials about the ejectors of the present disclosure ensure fluid flow through and along the inerting system flow path. Accordingly, mechanical driving mechanisms (e.g., fans or blowers) may not be needed within inerting systems as provided by embodiments of the present disclosure.

Figure 6:
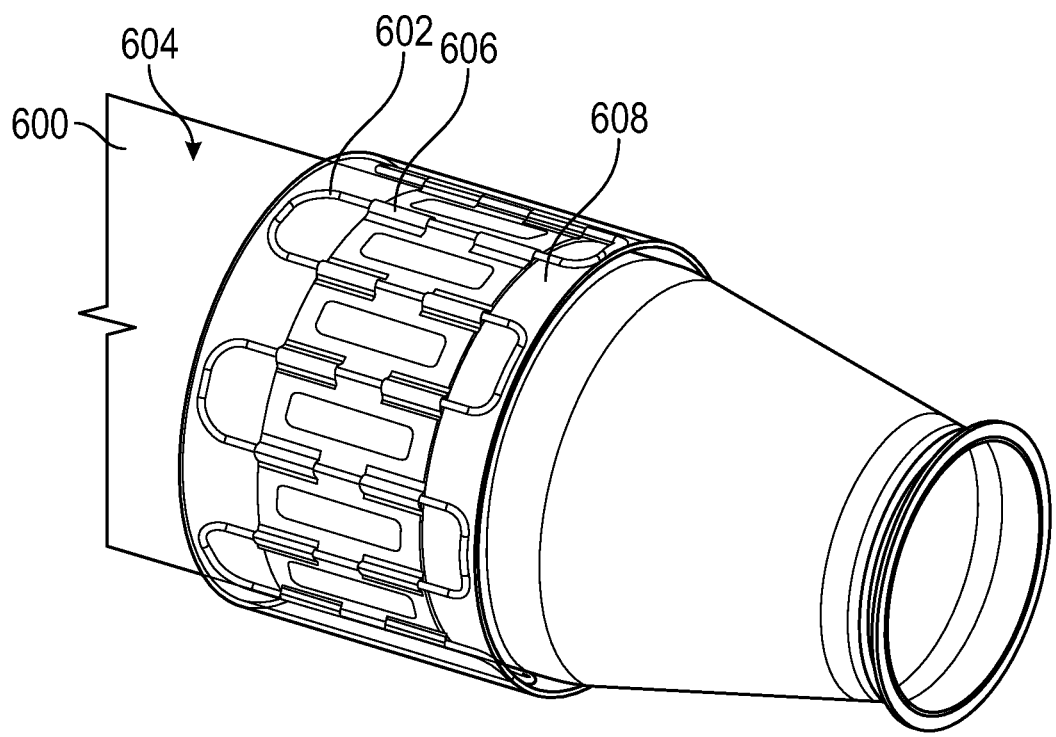
FIG. 6 is a schematic illustration of a catalytic reactor that may be employed in accordance with an embodiment of the present disclosure.

Turning now to FIG. 6, a schematic illustration of a portion of an inerting system in accordance with an embodiment of the present disclosure is shown. FIG. 6 illustrates a catalytic reactor 600 with a heating coil 602 wrapped around the catalytic reactor 600. The heating coil 602 is a fluid conduit through which a first reactant of an inerting system passes (e.g., fuel). The heating coil 602 is attached to an exterior surface 604 of the catalytic reactor 600 by a bracket 606. The size (e.g., diameter) and length of the heating coil 602 that contacts the external surface 604 of the catalytic reactor 600 may be configured to ensure that the first reactant, as it passes through the heating coil 602, will be vaporized prior to reaching the above described first ejector. That is, when the first reactant reaches the first ejector to be mixed with the second reactant, the first reactant will be in vapor form. In FIG. 6, a shielding cover 608 may be optionally provided to thermally insulate and/or retain the heating coil 602 to the catalytic reactor 600.

Advantageously, embodiments described herein provide for improved catalytic inerting systems, particularly for aerospace and aircraft applications. The systems described herein enable the reduction in number of components, thus reducing the weight and volume occupied by such inerting systems. Moreover, embodiments described herein enable the elimination of forced control of flow, but rather enables the use of passive flow control and driving, which is achieved through pressure differentials, as described herein. Further, advantageously, embodiments of the present disclosure can eliminate the need for a fan or compressor and reduce the number of moving components within such systems. This can aid in increasing system life due to the reduce number of components and parts that can fail.

The use of the terms "a," "an," "the," and similar references in the context of description (especially in the context of the following claims) are to be construed to cover both the singular and the plural, unless otherwise indicated herein or specifically contradicted by context. The modifier "about," "substantially," and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description, but is only limited by the scope of the appended claims.

What is claimed is:

1. A fuel tank inerting system, the system comprising:
a fuel tank;
an inerting system flow path connected to the fuel tank;
a first reactant source configured to supply a first reactant into the inerting system flow path;
a second reactant source configured to supply a second reactant into the inerting system flow path;
a catalytic reactor arranged along the inerting system flow path configured to receive a reactant mixture comprising a mixture of the first reactant and the second reactant to generate an inert gas to be supplied to the fuel tank through the inerting system flow path to fill an ullage space of the fuel tank;
a condenser heat exchanger arranged along the inerting system flow path between the catalytic reactor and the fuel tank and configured to cool an output from the catalytic reactor;
a first ejector arranged along the inerting system flow path and configured to receive the first reactant at a first ejector first inlet, the second reactant at a first ejector second inlet, and output the reactant mixture through a first ejector outlet; and
a second ejector arranged along the inerting system flow path and configured to receive an inert gas at a second ejector first inlet, the second reactant at a second ejector second inlet, and output a mixture of the second reactant and inert gas through a second ejector outlet,
wherein the inerting system flow path comprises:
a hot cycle junction downstream from the catalytic reactor and upstream from the condenser heat exchanger; and
a cool cycle junction downstream from the condenser heat exchanger and upstream from the fuel tank.

2. The fuel tank inerting system of claim 1, wherein a fluid pressure at the first ejector first inlet is less than a fluid pressure at the first ejector second inlet.

3. The fuel tank inerting system of claim 2, wherein a fluid pressure at the first ejector outlet is a fluid pressure between the fluid pressure at the first ejector first inlet and the fluid pressure at the first ejector second inlet.

4. The fuel tank inerting system of claim 1, wherein a fluid pressure at the second ejector first inlet is less than a fluid pressure at the second ejector second inlet.

5. The fuel tank inerting system of claim 4, wherein a fluid pressure at the second ejector outlet is a fluid pressure between the fluid pressure at the second ejector first inlet and the fluid pressure at the second ejector second inlet.

6. The fuel tank inerting system of claim 1, wherein a portion of inert gas may be directed upstream from at least one of the hot cycle junction and the cool cycle junction.

7. The fuel tank inerting system of claim 1, wherein the hot cycle junction is configured to direct hot inert gas to a location upstream of the catalytic reactor to be mixed with the reactant mixture.

8. The fuel tank inerting system of claim 7, further comprising a hot cycle flow controller arranged between the hot cycle junction and the second ejector, wherein the hot cycle flow controller is configured to control a flow of hot inert gas.

9. The fuel tank inerting system of claim 8, wherein the hot cycle flow controller is one of a valve or an orifice arranged along the inerting system flow path.

10. The fuel tank inerting system of claim 1, wherein the cool cycle junction is configured to direct cool inert gas to a location upstream of the catalytic reactor to be mixed with the reactant mixture.

11. The fuel tank inerting system of claim 10, further comprising a cool cycle flow controller arranged between the cool cycle junction and the second ejector, wherein the cool cycle flow controller is configured to control a flow of cool inert gas.

12. The fuel tank inerting system of claim 11, wherein the cool cycle flow controller is an isolation valve.

13. The fuel tank inerting system of claim 1, wherein the fuel tank inerting system does not include a recirculation heat exchanger.

14. The fuel tank inerting system of claim 1, further comprising a water collector arranged downstream from the condenser heat exchanger along the inerting system flow path.

15. The fuel tank inerting system of claim 1, wherein the first reactant is fuel and the second reactant is air.

16. The fuel tank inerting system of claim 15, wherein the first reactant source is the fuel tank.

17. A fuel tank inerting system, the system comprising:
a fuel tank;
an inerting system flow path connected to the fuel tank;
a first reactant source configured to supply a first reactant into the inerting system flow path;
a second reactant source configured to supply a second reactant into the inerting system flow path;
a catalytic reactor arranged along the inerting system flow path configured to receive a reactant mixture comprising a mixture of the first reactant and the second reactant to generate an inert gas to be supplied to the fuel tank through the inerting system flow path to fill an ullage space of the fuel tank;
a condenser heat exchanger arranged along the inerting system flow path between the catalytic reactor and the fuel tank and configured to cool an output from the catalytic reactor;
a first ejector arranged along the inerting system flow path and configured to receive the first reactant at a first ejector first inlet, the second reactant at a first ejector second inlet, and output the reactant mixture through a first ejector outlet;
a second ejector arranged along the inerting system flow path and configured to receive an inert gas at a second ejector first inlet, the second reactant at a second ejector second inlet, and output a mixture of the second reactant and inert gas through a second ejector outlet; and
a heating coil wrapped around the catalytic reactor, the heating coil configured to heat the first reactant upstream of the first ejector.

18. The fuel tank inerting system of claim 17, further comprising a shielding cover configured to at least one of thermally insulate and retain the heating coil to the catalytic reactor.

19. The fuel tank inerting system of claim 17, wherein the heating coil is wrapped around the catalytic reactor such that the first reactant will vaporize as it passes through the heating coil.

20. A fuel tank inerting system, the system comprising:
a fuel tank;
an inerting system flow path connected to the fuel tank;
a first reactant source configured to supply a first reactant into the inerting system flow path;
a second reactant source configured to supply a second reactant into the inerting system flow path;
a catalytic reactor arranged along the inerting system flow path configured to receive a reactant mixture comprising a mixture of the first reactant and the second reactant to generate an inert gas to be supplied to the fuel tank through the inerting system flow path to fill an ullage space of the fuel tank;
a condenser heat exchanger arranged along the inerting system flow path between the catalytic reactor and the fuel tank and configured to cool an output from the catalytic reactor;
a first ejector arranged along the inerting system flow path and configured to receive the first reactant at a first ejector first inlet, the second reactant at a first ejector second inlet, and output the reactant mixture through a first ejector outlet;
a second ejector arranged along the inerting system flow path and configured to receive an inert gas at a second ejector first inlet, the second reactant at a second ejector second inlet, and output a mixture of the second reactant and inert gas through a second ejector outlet; and
a water collector arranged downstream from the condenser heat exchanger along the inerting system flow path.

\* \* \* \* \*